Patented Nov. 29, 1938 2,138,193

UNITED STATES PATENT OFFICE.

2,138,193
ESTERS OF PINE WOOD PITCH AND METHOD OF PRODUCING

Ernest G. Peterson, Wilmington, Del., assignor to Hercules Powder Company, Wilmington, Del., a corporation of Delaware No Drawing. Application August 21, 1935, Serial No. 37,166

26 Claims. (Cl. 260—104)

This invention relates to esters of extracted pine wood pitch and to methods of producing the same, and more particularly, to esters of extracted pine wood pitch with a polyhydric alcohol, as, for example, ethylene glycol, propylene glycol, diethylene glycol, glycerol, pentaerythritol, etc.

Extracted pine wood pitch is obtained in connection with the production of wood rosin from pine wood. The pine wood pitch will comprise oxidized resinous matter, oxidized terpenes, polyphenols, polymerized terpenes and more or less ligneous matter, but will differ somewhat in its specific characteristics, such as acid number, melting point, petroleum ether solubility and content of naphtha and toluol soluble matter, depending upon the method for the recovery of rosin from pine wood used in its production.

As is well known, rosin is extracted from pine wood by the use of a suitable solvent, such as hot gasoline, or benzol after steaming of the wood with live steam to remove volatile oils, such as turpentine and pine oil. Again, volatile oils, as turpentine, and pine oil, are extracted with the rosin without first steaming for their removal.

Following extraction the extract is distilled for the removal of solvent where the wood was subjected to steaming before extraction and for the removal of solvent and volatile oils, as turpentine and pine oil, where the wood was extracted directly without steaming. As the result of distillation a resinous material consisting of a mixture of rosin, oxidized resinous matter, oxidized terpenes, polyphenols, polymerized terpenes, and ligneous matter is obtained. This resinous material may be treated in any one of a number of ways, all known to the art, for the removal of refined rosin. The residue remaining after the removal of refined rosin and including oxidized resinous matter, oxidized terpenes, polyphenols, polymerized terpenes and ligneous matter originally present in the extract and comprising a dark colored, hard, resinous mass constitutes the pine wood pitch.

The exact properties of the pine wood pitch obtained as indicated above will depend upon the method used for original extraction from the wood. When the wood is steamed before solvent extraction, a pine wood pitch is obtained having somewhat different properties from that obtained when the wood is extracted without steaming. Likewise the properties of pine wood pitch are somewhat different when obtained by different methods of purification of rosin. A comparison of the properties of three pine wood pitches is given in the following table, in which pitch A is that obtained by extraction of wood with hot petroleum solvents subsequent to the removal of the volatile oils by steam distillation, refining with furfural, and then evaporation of the furfural. Pitch B is that obtained by a benzol extraction of unsteamed wood, evaporation of the benzol solution of the residue in hot low boiling petroleum solvent, precipitation of the pitch B by washing with cold water, and then removal of this precipitate by filtration. Pitch C is obtained by the evaporation of the furfural layer, after refining of the gasoline solution of the crude resin obtained by the benzol extraction of pine wood.

|  | Pitch A | Pitch B | Pitch C |
|---|---|---|---|
| Melting point (Hercules drop method) | 91° C. | 115° C. | 102° C. |
| Acid number | 100 | 105 | 116 |
| Unsaponifiable matter | | 5% | 8% |
| Varnish maker's and painter's naphtha (petroleum hydrocarbon fraction—boiling range of 100° C. to about 150° C.) insoluble | 89.5% | 96% | 83% |
| Toluol soluble | | 40% | 98% |
| Petroleum ether insoluble | 92.0% | 99% | 95% |
| Saponification number | | 169 | 140 |
| Ash | | .036% | .022% |

In the above table and in the tables appearing hereinafter, the melting points given were obtained by a method designated as the "Hercules drop method", which is specifically as follows: 0.50 to 0.55 gram of resin is molded around the bulb of a thermometer by immersing the thermometer bulb in the heated resin. The thermometer is fitted through a cork in a test tube to within one-half inch of the bottom. The test tube is then immersed in a water bath or an oil bath and the bath heated gradually. The temperature at which the resin necks off the thermometer bulb is taken as the melting or softening point.

It is often desirable to subject the extracted pine wood pitch to a heat treatment at about 200°–250° C. to reduce a certain tendency to foam possessed by the untreated pitch. Such heat treatment will change the physical properties of the pine wood pitch to some extent. Thus, pitch B when heat treated has the following characteristics:

|  | Heat treated pitch B |
|---|---|
| Melting point (drop method) | 120° C. |
| Acid number | 83 |
| Unsaponifiable matter | 10% |
| Varnish maker's and painter's naphtha (petroleum hydrocarbon fraction—boiling range of 100° C. to about 150° C.) insoluble | 97% |
| Toluol soluble | 80% |
| Petroleum ether insoluble | 99% |
| Saponification number | |
| Ash | .040% |

While extracted pine wood pitch possesses the desirable properties of high-dielectric strength and substantial insolubility in petroleum hydrocarbons, properties which render it very valuable for use in insulation and in coating compositions, it possesses a very considerable acidity which makes it more or less unsuitable for certain uses for which it would otherwise be well adapted.

Now in accordance with this invention it has been found that extracted pine wood pitch may be reacted or esterified with alcohols, and more particularly with polyhydric alcohols, as, for example, ethylene glycol, propylene glycol, diethylene glycol, glycerol, pentaerythritol, etc. to produce esters which are substantially neutral and which, surprisingly, retain substantially the same high dielectric strength and insolubility in petroleum hydrocarbon as that possessed by the unesterified extracted pine wood pitch. Fatty acids or glyceride oils may be included in the esterification to give modified esters of varying degrees of flexibility.

The esters in accordance with this invention will be produced by reacting extracted pine wood pitch with an alcohol, and more specifically with a polyhydric alcohol, as, for example, ethylene glycol, propylene glycol, diethylene glycol, triethylene glycol, glycerol, pentaerythritol, etc. The extracted pine wood pitch and the alcohol may be reacted in widely varying proportions, but ordinarily the amount of alcohol employed will be at least equal to that required for complete chemical combination with the pine wood pitch (as calculated from the acidity of the pitch) and will preferably be in excess of the exact combining weight by 10 to 200%. The alcohol may be added all in one portion at the start of the reaction, or in several portions during the reaction, as desired.

The pine wood pitch and the alcohol will ordinarily be heated together to effect the esterification reaction. The optimum temperature range to be employed will vary with the particular alcohol used, but will generally fall within a range of from about 100° C. to about 300° C., and for the polyhydric alcohols will preferably be within about the range 200° C.–300° C. Where the volatility of the alcohol necessitates, the reaction may be carried out under pressure, as in an autoclave, to obtain a suitable temperature. Esterification catalysts, as hydrogen chloride, sulfuric acid, p-toluene sulfonic acid, etc., may be used if desired. After the reaction is finished, which may take from 5 to 50 hours, depending on the temperature employed, the alcohol used, etc., any excess alcohol present may be removed by subjecting the mass to distillation, preferably under vacuum if the alcohol is high boiling while maintaining or raising, if necessary, the temperature at which the reaction was carried out.

The following examples are illustrative of practical procedure in accordance with this invention:

Example I 2500 grams of heat treated pitch B were melted and 113 parts glycerol added. The temperature was raised to 280° C. in one hour and held at 280–290° C. After two hours' heating at 280–290° C., 56 grams of glycerol were added, and after four hours' heating at 280–290° C. an additional 56 grams of glycerol were added. After six hours' heating at 280–290° C., vacuum was applied and the excess glycerol distilled off, the temperature being held at 280–290° C. The total heating was six and three-quarters hours at 280–290° C., and the total glycerol used was 225 grams, or 9 parts for each 100 parts of heat treated pitch B. The analysis of this ester was as follows:

| | |
|---|---|
| Acid No. | 35 (±5) |
| Sap. No. | 80 (±10) |
| M. P. (drop) °C. | 154.5 |
| Gasoline insoluble per cent | 93.3 |
| Petroleum ether insoluble per cent | 99.0 |
| Unsap. per cent | 12.8 |

Example II

The following ingredients were heated together at 295° C. for two hours:

| | Parts |
|---|---|
| Pitch B | 200 |
| Glycerin | 12 |
| Lime | 1 |

This product had the following characteristics:

| | |
|---|---|
| M. P. (drop method) °C. | 147.5 |
| Acid No. | 45±6 |

Example III 1000 grams of heat treated pitch B and 130 grams of ethylene glycol were heated together under an air reflux condenser at a temperature of 210° C. to 220° C. for six and one-half hours. Vacuum was then applied to remove the excess ethylene glycol. The analysis of the ester was:

| | |
|---|---|
| Acid No. | 35 |
| M. P. (drop) °C. | 124 |
| Gasoline insoluble per cent | 96.9 |

Example IV 1000 grams of heat treated pitch B and 160 grams of diethylene glycol were heated together under an air reflux-condenser at a temperature of 265° C. to 270° C. for seven hours. Vacuum was then applied to remove the unreacted diethylene glycol. The analysis of the ester was:

| | |
|---|---|
| Acid No. | 15 |
| M. P. (drop) °C. | 117 |
| Gasoline insoluble per cent | 98.5 |

Example V 1000 grams heat treated pitch B and 220 grams triethylene glycol were heated together under an air reflux condenser at a temperature of 270° C. to 280° C. for seven hours. Vacuum was then applied to remove the unreacted triethylene glycol. The analysis of this ester was as follows:

| | |
|---|---|
| Acid No. | 16 |
| M. P. (drop) °C. | 113.5 |
| Gasoline insoluble per cent | 98.4 |

Example VI 1000 grams of heat treated pitch B, 160 grams of diethylene glycol and 360 grams of castor oil were heated together under an air reflux condenser at a temperature of 260° C. to 270° C. for 7 hours. The unreacted glycol was then removed under reduced pressure. The analysis of the modified ester was:

| | |
|---|---|
| Acid No. | 23.5 |
| M. P. (drop) °C. | 72 |
| Gasoline insoluble per cent | 98.8 |

Example VII 1000 grams of heat treated pitch B, 130 grams of ethylene glycol and 370 parts of soya bean oil were heated together under an air reflux condenser at a temperature of 210° C. to 240° C. for 7 hours. The unreacted glycol was then removed under reduced pressure. The analysis of the modified ester was:

Acid No. _____ 22
M. P. (drop) _____°C__ 73.5
Gasoline insoluble_____per cent__ 93.2

The fatty acids of the oils may be used in place of the oils, in which case an added amount of alcohol sufficient to esterify the fatty acid is included. When the oil is used considerable splitting into the fatty acids occurs at the temperature of heating. In place of the castor oil and soya bean oil of Examples VI and VII other non-drying, semi-drying or drying oils may be employed, such as olive oil, rapeseed oil, cottonseed oil, cocoanut oil, linseed oil and China-wood oil. Fatty acids such as stearic acid, oleic acid and palmitic acid may also be used.

The esters and modified esters of pine wood pitch produced in accordance with this invention are characterized by a low acidity, high dielectric strength, and substantial insolubility in petroleum hydrocarbon solvents. They may accordingly be used to advantage in electrical insulation and in lacquers, varnishes, etc. formulated to insulate electrical apparatus or to resist the action of petroleum hydrocarbons.

It will be understood that the details hereinbefore set forth are illustrative only, and that they are in no way in limitation of the invention as herein broadly described and claimed.

What I claim and desire to protect by Letters Patent is:

1. The product of the reaction of an acidic pine wood pitch obtained by extraction of pine wood and comprising oxidized resinous matter, oxidized terpenes, polyphenols and polymerized terpenes with an alcohol.

2. The product of the reaction of an acidic pine wood pitch obtained by extraction of pine wood and comprising oxidized resinous matter, oxidized terpenes, polyphenols and polymerized terpenes with a polyhydric alcohol.

3. The product of the reaction of an acidic pine wood pitch obtained by extraction of pine wood and comprising oxidized resinous matter, oxidized terpenes, polyphenols and polymerized terpenes with a glycol.

4. The product of the reaction of an acidic pine wood pitch obtained by extraction of pine wood and comprising oxidized resinous matter, oxidized terpenes, polyphenols and polymerized terpenes with glycerol.

5. The method of producing an ester of pine wood pitch which includes reacting an acidic pine wood pitch obtained by extraction of pine wood and comprising oxidized resinous matter, oxidized terpenes, polyphenols and polymerized terpenes with an alcohol.

6. The method of producing an ester of pine wood pitch which includes reacting an acidic pine wood pitch obtained by extraction of pine wood and comprising oxidized resinous matter, oxidized terpenes, polyphenols and polymerized terpenes with a polyhydric alcohol.

7. The method of producing an ester of pine wood pitch which includes heating at reaction temperature a mixture of an acidic pine wood pitch obtained by extraction of pine wood and comprising oxidized resinous matter, oxidized terpenes, polyphenols and polymerized terpenes, and a polyhydric alcohol.

8. The method of producing an ester of pine wood pitch which includes heating at a temperature of from about 100° C. to about 300° C. a mixture of an acidic pine wood pitch obtained by extraction of pine wood and comprising oxidized resinous matter, oxidized terpenes, polyphenols and polymerized terpenes, and a polyhydric alcohol.

9. The method of producing an ester of pine wood pitch which includes reacting an acidic pine wood pitch obtained by extraction of pine wood and comprising oxidized resinous matter, oxidized terpenes, polyphenols and polymerized terpenes with a polyhydric alcohol in amount in excess of that required to combine with the pitch and then distilling off unreacted alcohol from the reaction mixture.

10. The method of producing an ester of pine wood pitch which includes reacting an acidic pine wood pitch obtained by extraction of pine wood and comprising oxidized resinous matter, oxidized terpenes, polyphenols and polymerized terpenes with a polyhydric alcohol in amount in excess of that required to combine with the pitch and then distilling off unreacted alcohol from the reaction mixture under vacuum.

11. The product of the reaction of an acidic pine wood pitch obtained by extraction of pine wood pitch and comprising oxidized resinous matter, oxidized terpenes, polyphenols and polymerized terpenes with a polyhydric alcohol in the presence of a glyceride oil.

12. The product of the reaction of a pine wood pitch obtained by extraction of pine wood pitch and comprising oxidized resinous matter, oxidized terpenes, polyphenols and polymerized terpenes with a polyhydric alcohol and a fatty acid.

13. The method of producing a synthetic resin which includes reacting an acidic pine wood pitch obtained by extraction of pine wood and comprising oxidized resinous matter, oxidized terpenes, polyphenols and polymerized terpenes, with an alcohol and a glyceride oil.

14. The method of producing a synthetic resin which includes reacting an acidic pine wood pitch obtained by extraction of pine wood and comprising oxidized resinous matter, oxidized terpenes, polyphenols and polymerized terpenes, with a polyhydric alcohol and a glyceride oil.

15. The method of producing a synthetic resin which includes reacting a pine wood pitch obtained by extraction of pine wood and comprising oxidized resinous matter, oxidized terpenes, polyphenols and polymerized terpenes, with a polyhydric alcohol and a fatty acid.

16. The method of producing an ester of pine wood pitch which includes reacting an alcohol and an acidic pine wood pitch obtained as a residue after the separation of rosin from a pine wood extract.

17. The method of producing an ester of pine wood pitch which includes reacting an acidic pine wood pitch, obtained by the extraction of pine wood and comprising oxidized resinous matter, oxidized terpenes, polyphenols and polymerized terpenes, with an alcohol in the presence of an esterification catalyst.

18. The method of producing an ester of pine wood pitch which includes heating at reaction temperature an acidic pine wood pitch, obtained by the extraction of pine wood and comprising oxidized resinous matter, oxidized terpenes, polyphenols and polymerized terpenes, and an alcohol in the presence of an esterification catalyst.

19. The product of the esterification of a pine wood pitch obtained by extraction of pine wood and comprising oxidized resinous matter, oxidized terpenes, polyphenols and polymerized terpenes with a polyhydric alcohol in the presence of linseed oil.

20. The product of the esterification of a pine wood pitch obtained by extraction of pine wood and comprising oxidized resinous matter, oxidized terpenes, polyphenols and polymerized terpenes with a polyhydric alcohol in the presence of China-wood oil.

21. The product of the reaction of acidic pine wood pitch obtained by extraction of pine wood and comprising oxidized resinous matter, oxidized terpenes, polyphenols and polymerized terpenes with ethylene glycol.

22. The product of the reaction of a pine wood pitch obtained by extraction of pine wood and comprising oxidized resinous matter, oxidized terpenes, polyphenols and polymerized terpenes with an alcohol and a fatty acid.

23. The product of the esterification of a pine wood pitch obtained by extraction of pine wood and comprising oxidized resinous matter, oxidized terpenes, polyphenols and polymerized terpenes with glycerol in the presence of linseed oil.

24. The product of the esterification of a pine wood pitch obtained by extraction of pine wood and comprising oxidized resinous matter, oxidized terpenes, polyphenols and polymerized terpenes with glycerol in the presence of China-wood oil.

25. The method of producing a synthetic resin which includes reacting an acidic pine wood pitch obtained by the extraction of pine wood and comprising oxidized resinous matter, oxidized terpenes, polyphenols and polymerized terpenes, with an alcohol and a vegetable oil.

26. The method of producing a synthetic resin which includes reacting an acidic pine wood pitch obtained by the extraction of pine wood and comprising oxidized resinous matter, oxidized terpenes, polyphenols and polymerized terpenes, with an alcohol and stearic acid.

ERNEST G. PETERSON.